Figure 1:
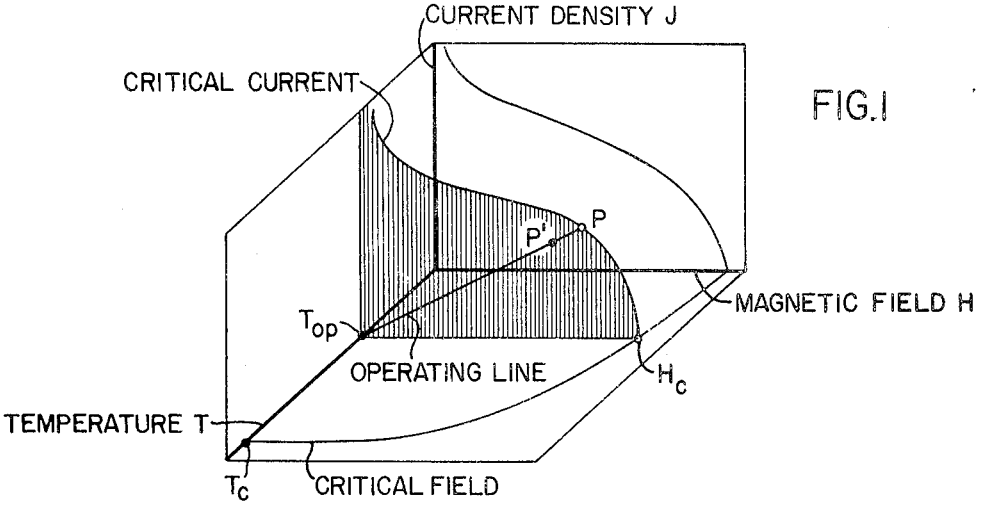
Figure 3:
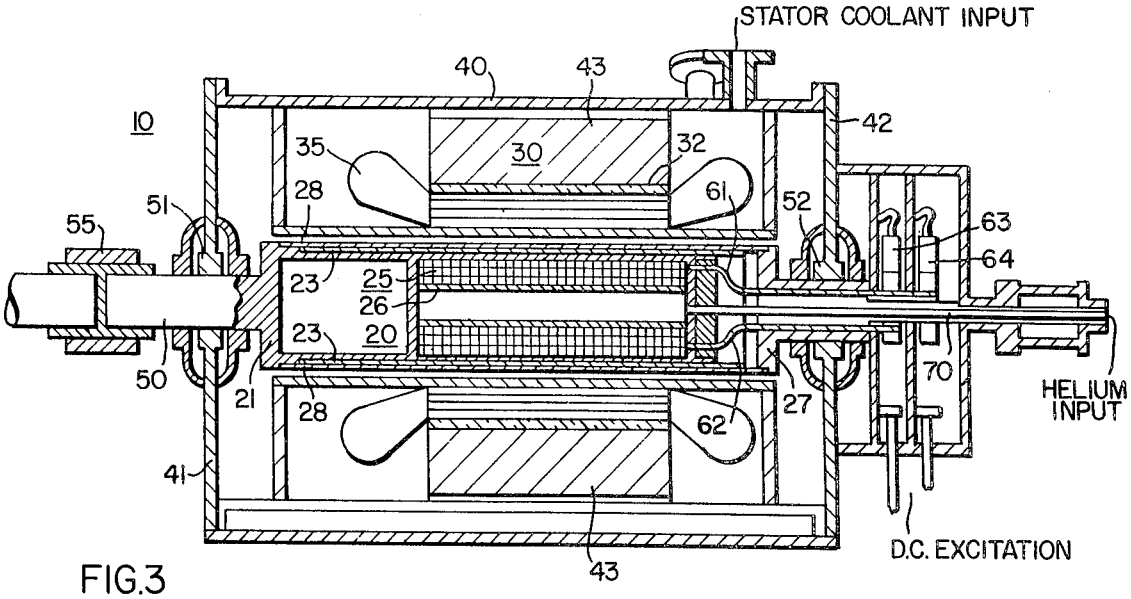
Figure 4:
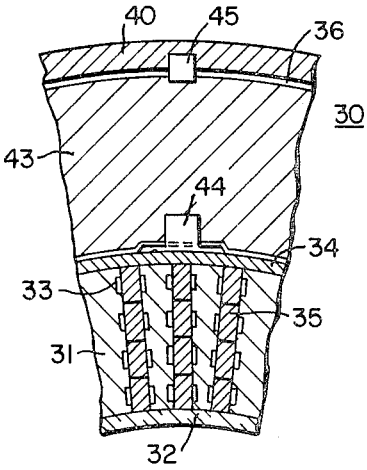
Figure 2:
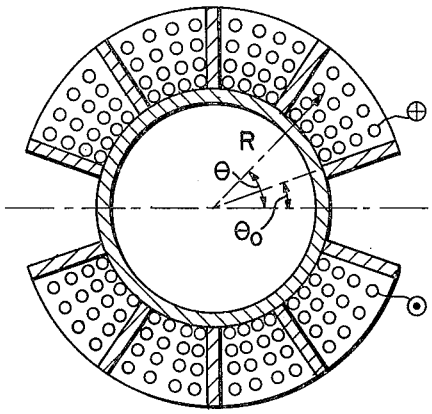
FIG.2 PRIOR ART
Figure 5:
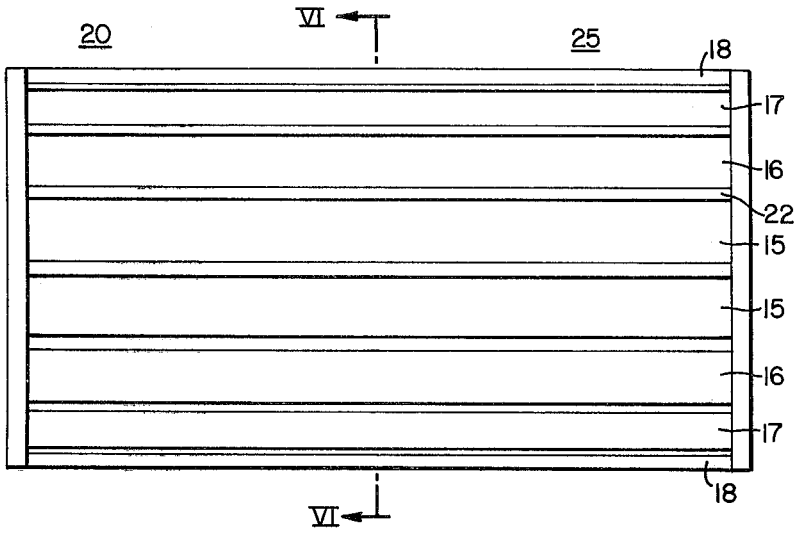
Figure 6:
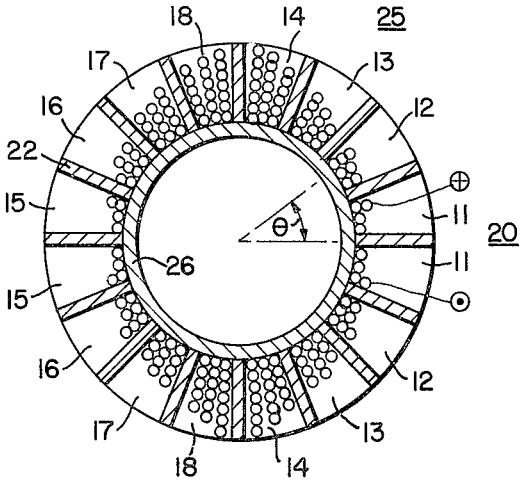

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 191

T942,008
SUPERCONDUCTIVE WINDING FOR DYNAMOELECTRIC MACHINE

Walter J. Carr, Jr., Pittsburgh, Pa., assignor to Westinghouse Electric Corporation, Pittsburgh, Pa.

Filed Jan. 2, 1975, Ser. No. 538,063
Int. Cl. H02k *9/00*
U.S. Cl. 310—40
2 Sheets Drawing. 12 Pages Specification

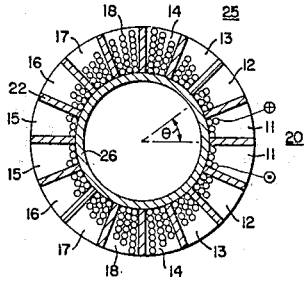

A superconductive winding is provided for the rotor of a dynamoelectric machine. The winding comprises a plurality of series connected, multi-turn superconductive coils which are angularly disposed about the rotor thereby defining two magnetic poles of opposite polarity. The conductor packing density is generally proportional to the trigonometric sine of the angular displacement as measured from the geometric center of one magnetic pole toward the geometric center of the opposite magnetic pole. The magnetic field produced within the sinusoidally distributed winding is substantially uniform as compared with the field produced by a conventional winding having a uniform packing density. The current density can be increased above the maximum value allowable for the conventional winding, thereby providing a net increase in the useful external field obtained from a given amount of superconductive material.